April 14, 1959 — F. J. CHARHUT — 2,882,074
UNITIZED, PRE-STRESSED SEAL UNIT
Filed June 14, 1955
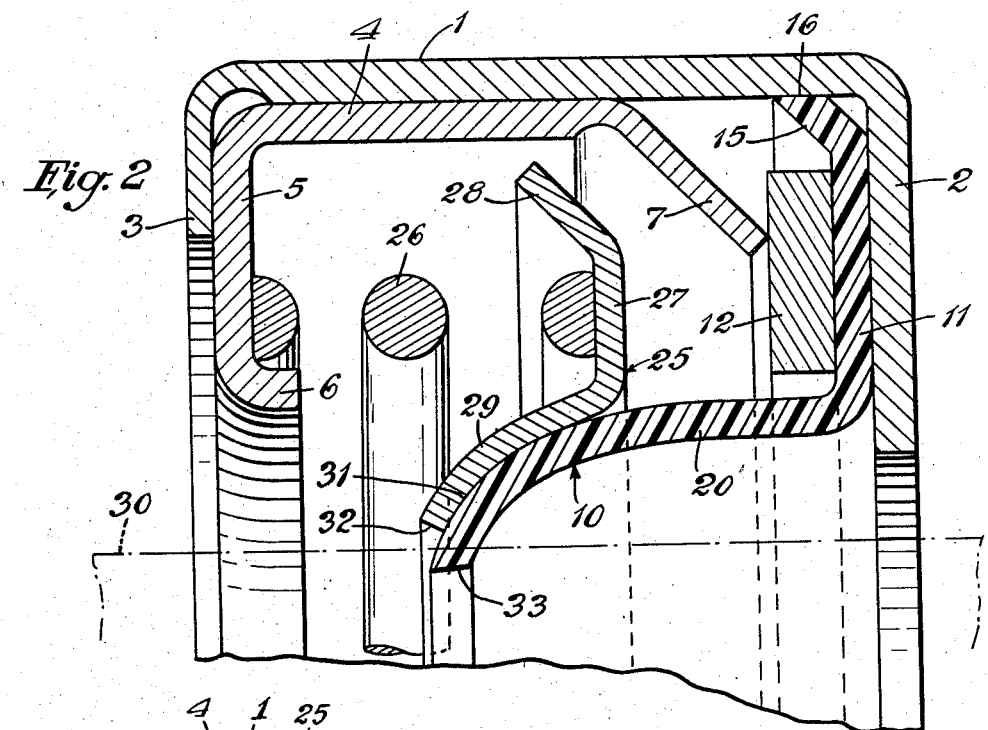
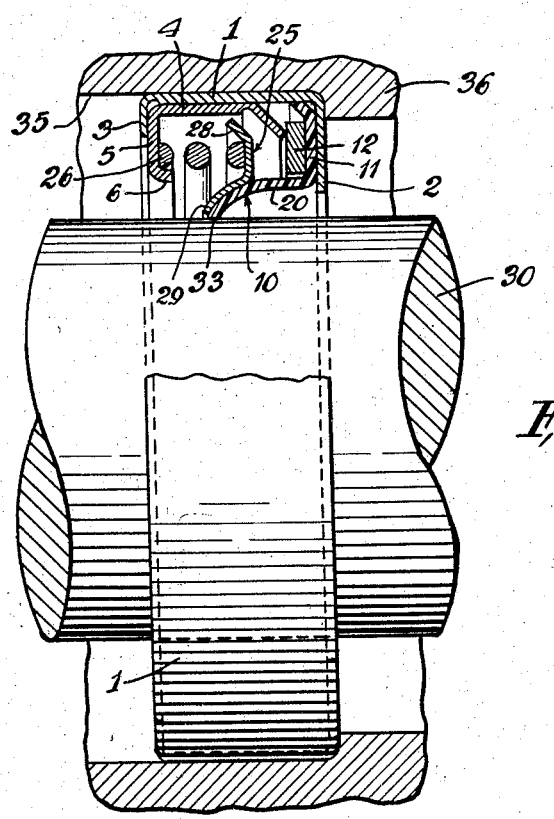
Inventor
Frank J. Charhut
by Parker & Carter
Attorneys

United States Patent Office 2,882,074
Patented Apr. 14, 1959

2,882,074

UNITIZED, PRE-STRESSED SEAL UNIT

Frank J. Charhut, Chicago, Ill., assignor to Chicago-Allis Mfg. Corp., Chicago, Ill., a corporation of Delaware Application June 14, 1955, Serial No. 515,359

3 Claims. (Cl. 286—11)

This invention relates to sealing devices and envisions, as one purpose, the provision of an efficient and reliable sealing device for preventing fluid leakage when used in conjunction with a moving or rotating shaft.

Another purpose is to provide a prestressed sealing unit.

Another purpose is to provide a unitized seal device.

Another purpose is to provide a sealing device which may be assembled and set at the factory and which will therefore require no later adjustment.

Another purpose is to provide a sealing device which shall be a compact, complete unit and which may be positioned as a unit in a bore or on a shaft wherein the shaft or bore moves or rotates.

Another purpose is to provide a sealing device employing a seal element formed of a flat disc of material, one of the properties of which has a tendency to return to its original flat configuration when subjected to increased temperatures.

Another purpose is to provide a sealing device employing a seal element which may be of a variety of materials, and having a property of flexing or rolling into sealing engagement and means for causing such flexing or rolling.

Other purposes will appear from time to time in the course of the specification and claims.

I illustrate my invention more or less diagrammatically in the accompanying drawings wherein:

Figure 1 is a side view in partial cross section.

Figure 2 is a detail view in partial cross section on an enlarged scale.

Like parts are indicated by like symbols throughout the specification and drawings.

Referring now to the drawings, and particularly to Figure 1 thereof, the numeral 1 generally designates a seal-supporting shell or outer housing member. The shell may have parallel-spaced, inwardly extending, annular flanges 2, 3. It will be observed that the flange 2 extends inwardly a distance somewhat greater than that of flange 3. Positioned or telescoped within the generally cylindrical outer shell 1 is an inner cylindrical shell member or seal-supporting member 4 having at one end thereof an inwardly extending annular flange 5. The flange 5 has an end portion 6 turned inwardly therefrom in spaced parallel relation with the wall of the shell 4. The shell 4 has an inwardly inclined conical end portion 7, the purpose of which will appear hereinbelow.

A seal element or diaphragm 10 has an annular outer portion 11 positioned within and against the inner surface of the flange 2 of the outer shell 1. A thrust ring or washer 12 may be positioned against the inner surface of the annular seal element portion 11, and the inwardly inclined flange 7 of the inner shell 4 may urge the thrust ring against the seal element portion 11 and clamp the ring 12 and portion 11 against the flange 2 of the outer shell 1. As best seen in Figure 1, it will be observed that the shell 4, thrust washer 12, and seal element portion 11 are positioned within and between the flanges 2, 3 of the outer cylindrical shell 1, the inwardly directed flange 5 of the shell 4 abutting the inner surface of the flange 3 on the shell 1 and the flange 7 of the shell 4 serving to clamp the washer or thrust ring 12 against the inner surface of the seal element portion 11.

It will be understood that the unitized seal member thus formed may be positioned within the bore of one of a pair of relatively movable members, for example, in the bore 35 of the fixed member 36 and that a shaft 30 may extend through the packaged seal unit and bore 35, as illustrated in the drawings. It will be realized, while the parts are shown in the drawings as arranged to seal a shaft, the device may be arranged to seal the inner surface of a bore without departing from the nature and scope of my invention.

The clamped annular diaphragm portion 11 has an outer inclined peripheral edge portion 15 having a chamfered edge surface 16 abutting the inner surface of the wall of the shell 1.

The seal member 10 has an inwardly axially directed central flexing portion 20 extending for a substantial distance generally perpendicularly from the seal portion 11 and generally paralleling the wall of the shell 1.

A seal-flexing element 25, of generally rigid, non-expansible material, is positioned between the flanges 5, 7 of the inner shell 4 and generally in axial alignment with the flange 5. The ring-like seal-positioning element 25 may be urged toward the flange 2 of the shell 1 by a spring member or other compressive member 26. The member 25 may have, for example, a generally annular portion 27 against which the spring 26 may abut, the opposite end of the spring 26 abutting the inner surface of the annular flange 5 on the shell 4. A flared outer peripheral end portion 28 of the ring member 25 may serve to position the spring 26 on the annular portion 27. The flared portion 28 generally parallels the portion 7 and, as best seen in Figure 2, the portion 28 may be initially spaced from the portion 7 to permit travel of the element 25 axially toward the element 12 a predetermined distance.

The central concave annular segment 29 of the seal-controlling ring member 25 surrounds and is urged by the spring 26 against the outer surface of the flexing portion 20 of the seal 10 adjacent the inner edge thereof as indicated generally at 31 and is thus caused to float on and with the flexing portion 20. The concave portion 29 has an inner circular edge 32 terminating short of the inner sealing lip 33 of the seal ring 10. The member 25 serves thus to maintain the concentricity of the lip 33. In addition, the seal-positioning element 25 is effective to deliver spring pressure to the lip 33 of the seal 10 and the concave ring portion 29 is effective to convert the pressure of the spring 26 into rolling pressure equally against all points on the circumference of the flexible seal segment 20 to roll the lip 33 into sealing contact with the shaft 30.

It will be observed that the action of the concave seal contracting element portion 29 against the seal 10 is effective to flex the inner end of the seal 10 inwardly to cause the sealing lip 33 of the seal 10 to abut, in sealing relationship, the exterior surface of the shaft 30 and that the position of the member 25 axially along the seal portion 20, as urged by the spring 26 will influence the position and diameter of the lip 33.

The seal ring element 10 may be formed of a variety of materials. I find it preferable, however, to form the seal 10 of a material which, upon being subjected to the increased temperatures experienced in many of the mechanisms with which my seal will be associated, tends to flatten out. As one example, the material known generally as Teflon may be employed. It will be understood, however, that a variety of plastic or other materials may be employed without departing from the nature and scope of my invention. The seal 10 may be originally formed from flat disc of uniform thickness. The outer edge portion 15, when subjected to heat, tends to flatten, thus bringing the chamfered edge 16 into even closer static sealing contact with the inner surface of the shell 1. A similar reaction occurs with relation to the flexing portion 20.

I provide a packaged unit wherein the cylindrical shell or housing member 1 may have the flange 2 inwardly bent therefrom. The seal 10 may then be positioned with the seal portion 11 against the inner surface of the flange 2. Thrust ring 12 may then be positioned against the inner annular surface of the seal portion 11. The ring 25 and spring 26 are then placed within the cylindrical member 4 and the end 7 or the portion 5 of the member 4 may then be inwardly bent. The assembly thus formed of the member 4, spring 26 and ring 25 may then, as a unit, be telescoped into the shell 1 from the end thereof opposite the flange 2. As the shell 4 is moved into the shell 1, the flange 7 is brought into contact with the ring 12 and the spring 26 is compressed between ring 25 and inwardly extending flange 5 of the shell 4 to urge ring portion 29 into contact with seal 10 to roll the sealing lip 33 into sealing position. When the parts have been properly positioned, i.e., when shell 4 has been telescoped a proper distance into shell 1, the end portion of shell 1 opposite the flange 2 thereof may be turned over to form the flange 3 against the outer surface of the flange 5 of shell 4 and thus to permanently position the parts of the seal unit in a single unitary sealing package element.

It should be understood that, as illustrated in Figure 1 of the drawings herein, only the sealing lip 33 is brought into contact with the shaft or element to be sealed. As may be best seen in Figure 2, the outer diameter of ring 27 is less than the inner diameter of the housing formed by the shells 1, 4. The tubular portion 20 of the seal 10 is of course flexible laterally of the housing axis. The spring 26 is similarly flexible laterally of the housing axis. Thus is provided a structure wherein the spring 26, ring 27, and tubular seal portion 20 are free to float together in response to any eccentric or lateral movement of the shaft 30, and the seal is thereby maintained. Since the ring 27 and seal 10 are, at all of their positions, entirely within the housing formed by elements 2 and 5, it is apparent that such floating action is continuously maintained. Similarly, as the sealing edge or lip 33 tends to wear, it is believed clear that the spring 26 will be effective to urge the ring 25 along the surface of the flexible tubular seal portion 20 toward the annular portion 11 and thus to cause the spherical flange 29 to flex an additional amount of the seal portion 20 toward the element to be sealed to maintain the sealing edge 33 in sealing contact.

I claim:

1. In a seal unit a housing, a flexible seal element of uniform cross section and having an annular portion clamped within said housing, and a tubular portion extending inwardly axially within said housing for a distance less than the axial extension of said housing and means for continuously directing the inner end portion of said tubular portion inwardly to reduce the diameter of said end portion and to urge said end portion inwardly toward a shaft to be sealed, said means comprising a ring element positioned entirely within said housing at all positions of said ring element, said ring element surrounding said tubular portion and in contact with the outer surface thereof, said ring and tubular portion having central openings greater than the diameter of the shaft to be sealed and having outer diameters less than the inner diameter of said housing whereby said tubular portion and ring are free to float together in response to eccentric movements of said shaft and yielding means for continuously urging said ring along said tubular portion toward said annular portion.

2. A seal unit for rotating shafts and the like, comprising a circular housing, a flexible seal element having an annular portion clamped within said housing and a tubular portion extending inwardly from said annular portion axially of and within said housing for a distance less than the axial extension of said housing, and means for flexing the inner segment of said tubular portion inwardly toward the shaft to be sealed, said means comprising a ring element surrounding said tubular portion and in contact with the outer surface of said segment and yielding means in contact with said housing and said ring element and positioned to yieldingly continuously maintain said ring entirely within said housing and to urge said ring element along said tubular portion toward said annular portion, said ring having a central aperture with a diameter greater than that of the shaft to be sealed, but less than the inner diameter of said tubular portion when said ring is out of contact therewith, said ring and tubular portion having outer diameters less than the inner diameter of said housing whereby said tubular portion and said ring are free to float together in response to eccentric motion of said shaft.

3. A seal unit for shafts and the like, comprising an outer seal-supporting member and an inner seal-supporting member, a seal element of flexible material and of substantial uniform cross-section, said seal element having an annular portion clamped between said inner and outer members and having a flexible tubular portion extending generally perpendicularly from said annular portion, said tubular portion having an inner diameter substantially greater than the diameter of the shaft to be sealed and means for continuously, yieldingly urging the inner end of said tubular portion radially inwardly to maintain only the inner end edge surface of said tubular portion in sealing contact with the shaft to be sealed at all positions of said shaft, said last named means comprising a ring surrounding said tubular portion within said seal supporting members and having a spherical portion yieldingly held in continuous engagement with the outer surface of said tubular portion inner end, said ring being yieldingly held entirely within said seal supporting members at all positions of said ring and having an outer diameter less than the inner diameter of said members whereby said ring and flexible tubular portion are free to float together in response to eccentric movement of said shaft.

References Cited in the file of this patent

UNITED STATES PATENTS

| 1,925,729 | Gits | Sept. 5, 1933 |
| 2,021,414 | Gits | Nov. 19, 1935 |
| 2,481,793 | Stewart | Sept. 13, 1949 |
| 2,599,149 | Allen | June 3, 1952 |

FOREIGN PATENTS

| 550,641 | Great Britain | Jan. 18, 1943 |
| 662,083 | Great Britain | Nov. 28, 1951 |